United States Patent Office 3,454,461
Patented July 8, 1969

3,454,461
POLYETHYLENE-POLYVINYL FLUORIDE FILM LAMINATED STRUCTURE AND PROCESS OF MAKING SAME
Robert B. Paxton, Tonawanda, N.Y., assignor to E. I. du Pont de Nemours and Company, Wilmington, Del., a corporation of Delaware
No Drawing. Filed Apr. 15, 1966, Ser. No. 542,736
Int. Cl. B32b 27/30, 27/06, 15/20
U.S. Cl. 161—189                    4 Claims This invention relates to polyvinyl fluoride film structures and more particularly to a method for protecting the surface of polyvinyl fluoride film laminates and to the composites resulting therefrom.

Polyvinyl fluoride film/metal strip laminates, e.g., polyvinyl fluoride film/aluminum strip laminates, polyvinyl fluoride film/galvanized steel strip laminates, etc., can be easily post-formed into intricate shapes. However, some post-forming operations involve concave and convex 90° bends over rolls necessitating severe directional changes over a short span while the laminate strip is being advanced at rapid rates. Roll forming all too frequently burnishes (creates high gloss or shine areas) and/or scratches the surface of the polyvinyl fluoride, and the surface is also apt to become soiled and otherwise marred during handling.

A principal object of this invention, therefore, is to avoid burnishing (polishing or glossing) and/or scratching the surface of polyvinyl fluoride which occurs when polyvinyl fluoride/metal strip laminates are postformed by forming rolls. Another object is to prevent dirt accumulation on the polyvinyl fluoride surfaces, and marring of the surface during handling through lamination, forming, stacking, bundling, shipping and subsequent selection and application of the laminates. The foregoing and related objects will more clearly appear hereinafter.

These objects are realized by the present invention which, briefly stated, comprises subjecting polyethylene film to the action of a pulsating electrostatic discharge to render the surface thereof adherent, applying said film to the polyvinyl fluoride surface of a surface-receptive polyvinyl fluoride film/metal strip laminate, and subjecting the resulting composite to a pressure within the range of 10 to 40 pounds per inch width, and a temperature within the range of 150° to 215° C. It bas been found that the peel bond strengths between the polyethylene and the polyvinyl fluoride of the laminates so produced are within the range of 50 grams per inch to 250 grams per inch, so that the polyethylene film while adherable will be strippable.

Following is a diagrammatic representation of a typical laminated structure produced in accordance with this invention:

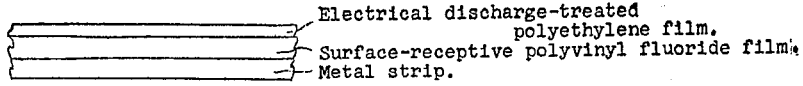

By the expression "surface-receptive polyvinyl fluoride film", used herein, is meant a polyvinyl fluoride film at least one of the surfaces of which has been activated and rendered adherent by exposing the film surface to a gaseous Lewis acid such as boron trifluoride, aluminum trichloride or titanium tetrachloride or a liquid composition containing a coordination complex thereof (U.S. Patents Nos. 3,122,445 and 3,228,823) or by subjecting the film to concentrated sulfuric acid, sulfur trioxide or hot sodium hydroxide (U.S. Patents Nos. 2,878,519 and 3,228,823) or by subjecting the film to an open flame (U.S. Patents Nos. 2,648,097, 3,153,683, and 3,153,684), or by subjecting the film to a pulsating electrical (electrostatic) discharge (U.S. Patent No. 3,113,208); etc.

Vinyl fluoride polymer employed in the film of this invention, in addition to homopolymers of vinyl fluoride includes copolymers of vinyl fluoride with other monoethylenically unsaturated monomers copolymerizable therewith, wherein the vinyl fluoride is present in substantial or major amounts, i.e., at least 75% to 80% of the total by weight. Examples are mono-ethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochlorethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate and vinyl esters of inorganic acids; vinyl ethers, e.g., vinyl ethyl ether, tetrafluoroethylallyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, and hydrides and acid halides, including methyl methacrylate, beta hydroxyethyl methacrylate, allyl methacrylate, N-butyl methacrylamide, etc.; derivatives of maleic and fumaric acids, e.g., diethyl maleate and dimethylfumarate; propenyl esters, e.g., allyl acetate, isopropenyl acetate, etc. Similarly, vinylidene fluoride and copolymers thereof, as well as fluorocarbon polymers generally, can be employed.

The polyvinyl fluoride film may contain one or more additives such as pigments, opacifiers, deglossing agents, thermal stabilizers, antioxidants, ultraviolet light absorbents, etc., depending generally upon the use to which the laminate is to be put.

Polyvinyl fluoride films, as is known to the art can be laminated, with or without the use of adhesives, to a wide variety of metal substrates such as aluminum, cold rolled steel, iron, galvanized iron and steel, aluminized steel, chromium, bronze, brass, lead, tin and nickel and various other alloys for use as materials of construction, e.g., siding, roofing, outdoor signs, wall tile, wall and ceiling paneling, Venetian blinds, interior partitioning, awnings, ductwork, counter- and table-tops, store fronts, rain gutters, downspouts, etc., in the building trade; and for many other uses. Prior to lamination, metallic substrates can and usually are given a conventional passivation or corrosion-inhibiting treatment such as that used commercially to prepare substrates for painting. Conventionally, the film is laminated to the treated substrate with adhesives and the composite of film and substrates with an intermediate adhesive layer is subjected to heat and pressure to complete the lamination.

In order to obtain a protective overlay of polyethylene film which will adhere to the polyvinyl fluoride surface of the laminate with sufficient tenacity to permit storing, handling, shipping, post-forming and application of the laminate without separation of the polyethylene film overlay, it is essential that the surface of the polyethylene film to be adhered be rendered adherent by subjecting it to a pulsating electrical discharge between spaced electrodes as disclosed, for example, in U.S. Patent No. 3,018,189. The treated film, under the influence of elevated temperatures within the range of 190° to 215° C., and pressures between 10 and 40 pounds per inch width, bonds to the surface-receptive polyvinyl with sufficient bond strength to render the resulting laminate structurally stable during handling, post-shaping, etc., but not with sufficient bond strength to prevent stripping of the overlay from the substrate when desired.

In a preferred embodiment of the invention, the electrical discharge-treated polyethylene film of suitable thickness is applied to the polyvinyl fluoride surface immediately following the lamination of the polyvinyl fluoride film to metal whereby to use the sensible heat of the laminate as the heat source for the polyethylene lamination. By thus utilizing metal laminate heat or finish curing heat and nip roll pressures, in finite measurements, excellent controlled adherability of polyethylene film to the polyvinyl fluoride surface can be obtained.

The following example will serve to further illustrate the principles and practice of the invention.

*Example*

A coil strip of aluminum 22 mils thick, was passivated by the treatment as recommended by the manufacturer with "Alodine" 1200. (Amer. Chem. Products, Inc.) The aluminum strip was then coated with an ammoniated acrylic ester polymer of N-butyl methacrylate (64 weight percent), methyl methacrylate (32.5 weight percent) and glycidyl methacrylate (3.5 weight percent) adhesive, prepared according to Example 1 of Belg. 610,317, and dried at 200° C. for 30 seconds to yield a dry adhesive thickness of 0.3 mils. A preformed polyvinyl fluoride film, 1.5 mils thick, flame treated in accordance with U.S. Patent No. 3,153,683, was immediately applied to the adhesive surface and the resulting structure was passed through nip rolls, while the structure was maintained at 200° C. under a nip roll pressure of 75 pounds per inch width.

Thereafter, a preformed film of polyethylene, 1 mil thick, pretreated by an electrical discharge in accordance with U.S. Patent No. 3,018,189, was applied to the heated polyvinyl fluoride/aluminum laminate and the resultant structure combined by passing through nip rolls maintained at 185° C. at a nip roll pressure of 15 pounds per inch of width. The resulting peel bond strength between the polyethylene and the polyvinyl fluoride, the average of 10 samples was 175 grams per inch, as measured with a Suter peel tester, and was readily stripped from the laminate.

What is claimed is:

1. A process which comprises, in combination, the steps of subjecting the surface of polyethylene film to the action of a pulsating electrostatic discharge, applying the resulting treated film to the polyvinyl fluoride surface of a surface-receptive polyvinyl fluoride film/metal strip laminate, the treated surface of the polyethylene surface being in contact with the surface-receptive surface of the polyvinyl fluoride film lamina of said strip laminate, and subjecting the resulting composite to a pressure within the range of 10 to 40 pounds per inch width and a temperature within the range of 150° to 215° C.

2. The process of claim 1 wherein said metal is aluminum.

3. As an article of manufacture a laminated structure comprising essentially a substrate of metal, a surface-receptive polyvinyl fluoride film bonded thereto and a film of electrical discharge-treated polyethylene film bonded to the top surface of said surface-receptive polyvinyl fluoride film, the bond strength of the bond between the polyethylene film and the polyvinyl fluoride film being within the range of 50 to 250 grams per inch.

4. The article of claim 3 wherein the metal is aluminum.

References Cited

UNITED STATES PATENTS

| | | | |
|---|---|---|---|
| 2,935,418 | 5/1960 | Berthold et al. | 161—412 X |
| 3,153,683 | 10/1964 | Bryan et al. | 264—80 |
| 3,228,823 | 1/1966 | Usala et al. | 161—186 |
| 3,284,277 | 11/1966 | Bonacci et al. | 161—188 |
| 3,313,676 | 4/1967 | Kamal et al. | 161—189 |

FOREIGN PATENTS 207,613   2/1957   Australia.

BERNARD ANSHER, *Primary Examiner.*

U.S. Cl. X.R.

156—82, 272, 306; 161—218, 254, 406, 412